United States Patent [19]

Vial

[11] Patent Number: 4,772,808

[45] Date of Patent: Sep. 20, 1988

[54] CONTROL DEVICE FOR ELECTRICAL APPLIANCES

[76] Inventor: Jean-Luc Vial, 2 Rue de la Moselle, Lyons, France, 69008

[21] Appl. No.: 3,852

[22] Filed: Jan. 16, 1987

[30] Foreign Application Priority Data

Jan. 17, 1986 [FR] France ................................ 86 00818

[51] Int. Cl.[4] ................................................ H02P 3/24

[52] U.S. Cl. .................................... 307/125; 307/127; 318/762; 318/758; 318/759; 361/23; 361/24; 361/33

[58] Field of Search ............... 307/125, 127, 117, 138; 361/23, 24, 25, 30, 31, 32, 33, 77, 106; 318/751, 753, 755, 756, 757, 758, 759, 763, 773, 774, 775, 777, 778, 782, 783, 784, 785, 786, 790–794, 471–473, 816, 817, 521, 523, 539, 244, 245, 350, 353, 357, 358, 356, 359, 399, 362–371, 375–383, 739–742, 757–762

[56] References Cited

U.S. PATENT DOCUMENTS

| | | | |
|---|---|---|---|
| 2,853,109 | 12/1958 | Meyer | 318/753 |
| 3,032,690 | 5/1962 | Elliot | 361/106 |
| 3,432,841 | 3/1969 | Harvey et al. | 361/23 X |
| 3,543,090 | 11/1970 | Pfister et al. | 361/106 X |
| 3,581,168 | 5/1971 | Kirkby | 318/759 |
| 3,761,794 | 9/1973 | Quinlisk et al. | 318/472 |
| 3,875,463 | 4/1975 | Reuter et al. | 361/77 X |
| 3,886,407 | 5/1975 | Anderson | 361/23 |
| 3,903,456 | 9/1975 | Schaefer | 361/24 |
| 3,958,164 | 5/1976 | Hess | 361/33 X |
| 4,035,660 | 7/1977 | Fletcher | 361/23 |
| 4,115,727 | 9/1978 | Gross | 318/762 |
| 4,241,302 | 12/1980 | Benjamin | 318/758 |
| 4,395,670 | 7/1983 | Podell | 318/758 |
| 4,450,397 | 5/1984 | Painter et al. | 318/375 X |

*Primary Examiner*—William M. Shoop, Jr.

*Assistant Examiner*—Paul Ip

*Attorney, Agent, or Firm*—Dowell & Dowell

[57] ABSTRACT

A control device for supplying current to electrical appliances and particularly appliances having single phase capacitor start motors wherein the control device includes a changeover switch which is mounted between a source of power and the appliance motor and which changeover switch includes selectively operated components for controlling the power supply to the appliance motor or to terminate the power supply thereto. In one embodiment of the invention, a second circuit is provided intermediate the power source and the appliance motor for detecting the amount of current flowing in the circuits so as to insure connection of the starting capacitor of the motor, braking of the single phase motor when power is terminated and to provide an indication of overcurrent in the motor.

12 Claims, 4 Drawing Sheets

CONTROL DEVICE FOR ELECTRICAL APPLIANCES

FIELD OF THE INVENTION

This invention concerns control devices for electrical apparatus supplied with alternating current, especially single phase capacitor motors.

Existing devices have the disadvantages of being made up of complicated components, specific to each particular usage, and are expensive to manufacture.

SUMMARY OF THE INVENTION

The aim of this invention is to achieve an economical control device, mainly composed of standard elements, that can provide several functions by means of manual action on one or several push-button type controls.

Some functions apply to any electrical appliance supplied with alternating current : constant power supply, intermittent power supply, power cut-off.

Other functions provided under the present invention apply only to the control of single phase capacitor motors : switching on of the capacitor when supplying power to start up the motor; electromagnetic braking when the power supply to the motor is cut off ; detection of overcurrent in the motor.

A second aim of the invention is to permit the connection of safety components of the electrical contact type to the control device used with any electrical appliance that will cut off power supply in order to protect the appliance, for instance in the case of overheating, or to protect the operator who is using the appliance. The status of the safety components authorizing or prohibiting the operation of the appliance can be displayed on one or two signal lamps, for example a red signal lamp to indicate operation prohibited, a green signal lamp to indicate operation authorized.

The control device according to the invention comprises a main part called a changeover switch and a part called a current detector which can be added to constitute a complete control unit for a single phase capacitor motor.

The part called changeover switch is made up of a relay comprising a make contact that can switch the alternating current onto the appliance. The relay coil is supplied from the same alternating current by placing a resistor, a push-button, closed for starting, and a rectifier diode, in series with the coil of the said relay. A capacitor placed in parallel with the coil of the said relay stabilises the rectified current. The relay is automatically supplied by a circuit comprising a push-button which opens to cut off power supply and a diode in series, all of which are connected to the common of the normally open push-button and of the relay coil and to the switched terminal of the relay contact.

Depending on which of the two push-buttons is actuated, the functions constant operation, power cut-off and intermittent operation of the appliance are obtained. Intermittent operation is obtained by actuating the normally open push-button while maintaining the normally closed push-button pressed down. If this last function is not required it can be eliminated by modifying the connection of the two push-buttons.

According to another feature of the part called the changeover switch, the three functions mentioned above can be carried out by three push-buttons, each having one function. To perform these three separate functions, a third push-button provided with a make contact and a break contact, along with a diode connected in the reverse direction to the two preceding diodes, are simply added. Intermittent operation is achieved by actuating this push-button which causes the current to flow in the opposite direction in the coil of the said relay, this having the advantage of eliminating a mishap that may occur in the other devices equipped with two push-buttons, namely the fact that the said changeover switch is maintained in the position of constant operation after the completion of the action for intermittent operation.

According to another feature of the said changeover switch, the set of push-buttons can be constructed with one or two conducting reeds called tongues and three conducting studs, the whole assembly being welded on a printed circuit and controlled by an insulating part called a lever which is used to obtain the three functions described.

According to yet another feature of the said changeover switch used to control a single phase motor, a break contact of the aforementioned relay equipping the said changeover switch, can be used to brake the said single phase capacitor motor. For single phase capacitor-start motors, this braking is achieved by switching the capacitor on the terminals of the said single phase motor by means of the break contact of the said relay.

According to yet another feature of the said changeover switch, electrical contact type safety components, which open to cut out power supply to the appliance, can be added to the circuit previously described. The status of these safety components can be displayed by means of one or two signal lamps. When the said safety contacts are closed, they feed the power supply to the control circuit of the said relay and to a signal lamp. When one at least of the said safety contacts is open the control circuit is no longer supplied with power and the other signal lamp is lit. The operator is therefore informed on the status of the said safety components and consequently on the possibility or not of supplying power to the appliance.

According to the invention, the part called the current detector is used mainly to control a single phase capacitor motor in addition to the part called changeover switch.

Its functions are to connect the capacitor of the said single phase capacitor motor for starting up, to disconnect the said capacitor when the said single phase motor has started, and, if applicable, to indicate overcurrent in the said single phase motor by means of a signal lamp.

Switching of the said starting capacitor is achieved by means of a relay equipped with a make contact and a break contact.

One of the features of the said current detector is that a low value resistor connected in series with the main circuit of the said single phase motor, generates a voltage at its terminals which renders a transistor conducting from its emitter-base junction when the said voltage reaches a certain threshold. To limit the current in the emitter-base junction of this transistor, a resistor is placed in series on the base of this transistor. To compensate the temperature effect, a resistor is placed in series on the emitter and, if required, a resistor with negative temperature efficient of resistance is placed in parallel on the emitter-base junction and on the resistor located on the emitter.

When the said transistor becomes conducting, a current rectified by a diode flows in the coil of the aforementioned relay and causes the make contact to close and the starting capacitor to switch on. A circuit comprising a resistor, zener diode, capacitor, placed in parallel on the power supply circuit, is used to limit the collector-emitter voltage of the transistor. A capacitor placed in parallel on the coil of the relay stabilises the rectified current.

Once the said single phase motor has started, the current decreases and the starting circuit which is no longer necessary is disconnected.

In the case of a mechanical overload or other operating anomaly of the said motor, the current value increases, the relay of the said current detector is then energized in the same way as for starting but remains permanently energized. A signal lamp placed in parallel on the coil of the said relay informs the operator of this overcurrent so as to prevent damage to the said single phase motor.

BRIEF DESCRIPTION OF THE DRAWINGS

Other features of the said changeover switch and the said current detector comprising this invention will appear more clearly in the description of the invention given with reference to FIGS. 1, 2, 3, 4 and 5 wherein.

DESCRIPTION OF THE PREFERRED EMBODIMENT

Figure 1:
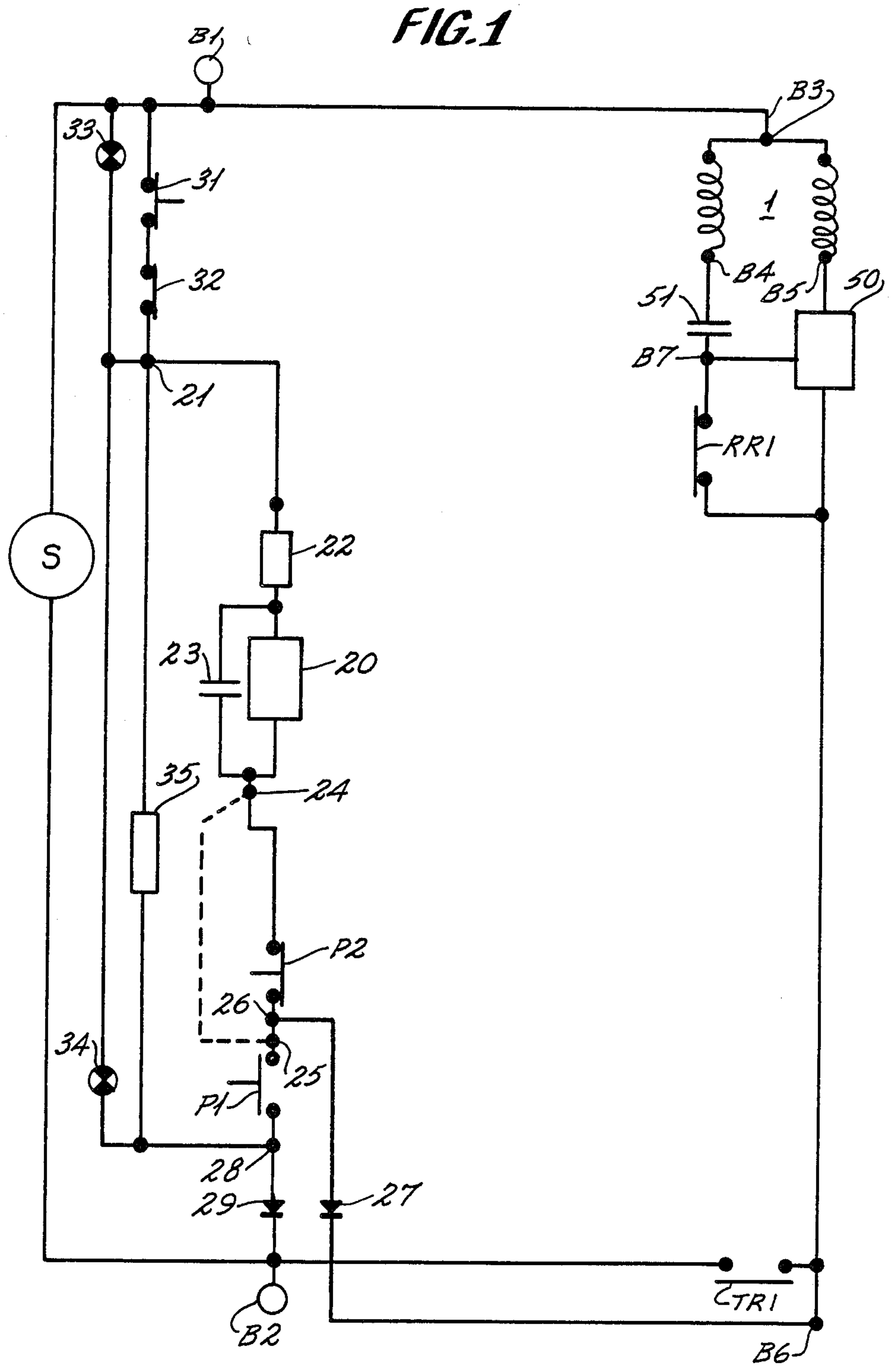
FIG. 1 is a circuit diagram illustrating the changeover switch of the present invention being mounted between a source of power and the motor of an electrical appliance wherein the changeover switch utilizes two push button controls.

In the embodiment illustrated in FIG. 1 and described hereafter, a control device according to the invention, called changeover switch, is connected to a single phase motor 1 that has a main winding connected between terminals B3 and B5 and a starting winding connected between terminals B3 and B4. A starting capacitor 50 connected between terminals B4 and B7 and is switched on for start-up by current relay R1 of the overload type having its coil connected between terminals B6 and B5 and its relay switching contact connected between terminals B5 and B7. The said changeover switch with four terminals B1, B2, B6 and B7, is connected to the alternating current supply source S via terminals B1 and B2, to the main motor circuit via terminal B6 and via terminal B1 common with terminal B3, while it is connected via terminal B7 to capacitor 51 for braking.

In FIG. 1 the changeover switch is in the inoperative position. Safety contact 31 is the thermal safety component of the motor and is closed if the temperature of the motor does not exceed the limiting operating temperature, otherwise it is open. Safety contact 32 is a limit switch actuated by the protection guard of the machine driven by the said single phase motor 1 in order to protect the operator. If contacts 31 and 32 are closed, terminal 21 and terminal B1 have the same electrical potential, the green signal lamp 34 is then lit by the current flowing through diode 29, and the red signal lamp 33 is not lit; the said changeover switch is enabled. If at least one of the two contacts 31, 32, is open due to the fact that the protective guard is missing or the temperature of the motor is too high, the electric power from source S flows through the red signal lamp 33, resistor 35 and diode 29. Resistor 35 is chosen so that the voltage at its terminals is low, causing the green signal lamp 34 to go out, the red signal lamp 33 to light up, prohibiting operation of the changeover switch.

When the said changeover switch is supplied via safety contacts 31 and 32, the operator can use the two push-button controls P1 and P2. If the operator actuates the normally open push-button P1, the current supplied from source S flows through resistor 22, relay coil 20, normally closed push-button P2, terminal 26, terminal 25, normally open push-button P1 and diode 29. The current is rectified by diode 29 and stabilized by capacitor 23. connected in parallel with relay coil 20 and causes the relay to make contact TR1 to close and power motor 1 through terminal B6 via current relay 50. When the operator releases push-button P1 the relay is held by the current supplied from source S and flowing through contacts 31, 32, resistor 22, relay coil 20, normally closed push-button P2, diode 27 and closed make contact TR1. The motor is powered by a constant voltage supply.

When the said operator actuates push-button P2 the current in the relay coil is cut off, relay make contact TR1 opens, the motor is no longer powered, break contact RR1 closes, connecting up capacitor 51 between terminals B1 and B5 of motor 1 via current relay 50, causing motor 1 to brake. This braking device can be eliminated by removing break contact RR1.

When the two push-buttons P1 and P2 are actuated simultaneously, no current flows in relay coil 20 and the action has no effect. According to an alternative embodiment of the changeower switch, simultaneous action on the two push-buttons P1 and P2 results in intermittent power supply. To achieve this, the connection between terminals 25 and 26 must be eliminated and terminals 24 and 25 must be interconnected. The operation for constant power supply and for power cut-off is identical to the description given above, but by intermittent action on push-button P1 while push-button P2 remains pressed, an intermittent current flows through relay coil 20 and consequently motor 1 receives an intermittent power supply.

The changeover switch for any type of electrical appliance supplied with alternating current that controls constant power supply, power cut-off of the said electrical appliance by actuating two push-buttons, has two terminals 21, B1 and B2, connected on the terminals of the alternating power source S, while the said electrical appliance has a terminal B3 connected to B1 and a terminal B5 connected to the third terminal B6 of the said changeover switch. The said changeover switch comprises a resistor 22 connected to terminal 21, B1 and connected in series to relay coil 20, a normally closed push-button P2, a normally open push button P1 and a diode 29 having its cathode connected to terminal B2. In addition the said changeover switch comprises a capacitor 23 connected in parallel with relay coil 20, a diode 27 having its anode connected to the common of push-buttons P1 and P2 and its cathode connected to terminal B6. Finally, the said changeover switch comprises the make contact TR1 of the said relay connected between terminals B6 and B2.

The changeover switch for any type of electrical appliance supplied with alternating current that controls constant power supply, intermittent power supply and power cut-off to the said electrical appliance by actuating two push-buttons, has two terminals 21, B1 and B2, connected to the terminals of the alternating power supply source S, while the said electrical appliance has a terminal B3 connected to terminal B1 and a terminal B6 connected to the third terminal B6 of the said changeover switch. The said changeover switch comprises a resistor 22 connected to terminal 21, B1 and connected in series with relay coil 20, a normally open push-button P1, a diode 29 having its cathode connected to terminal B2. In addition the said changeover switch comprises a capacitor 23 placed in parallel with relay coil 20, a normally closed push-button P2 connected to the common of push-button P1 and of relay coil 20, this push-button P2 being connected in series with a diode 27 having its cathode connected to terminal B6. Finally, the said changeover switch comprises the make contact TR1 of the said relay, connected between terminals B6 and B2.

An operating mishap may occur in the set-up described above, when the operator releases push-button 2 before or just after releasing pushbutton P1 and the relay remains energized by the current flowing in the relay coil through push-button P2 and diode 27.

Figure 2:
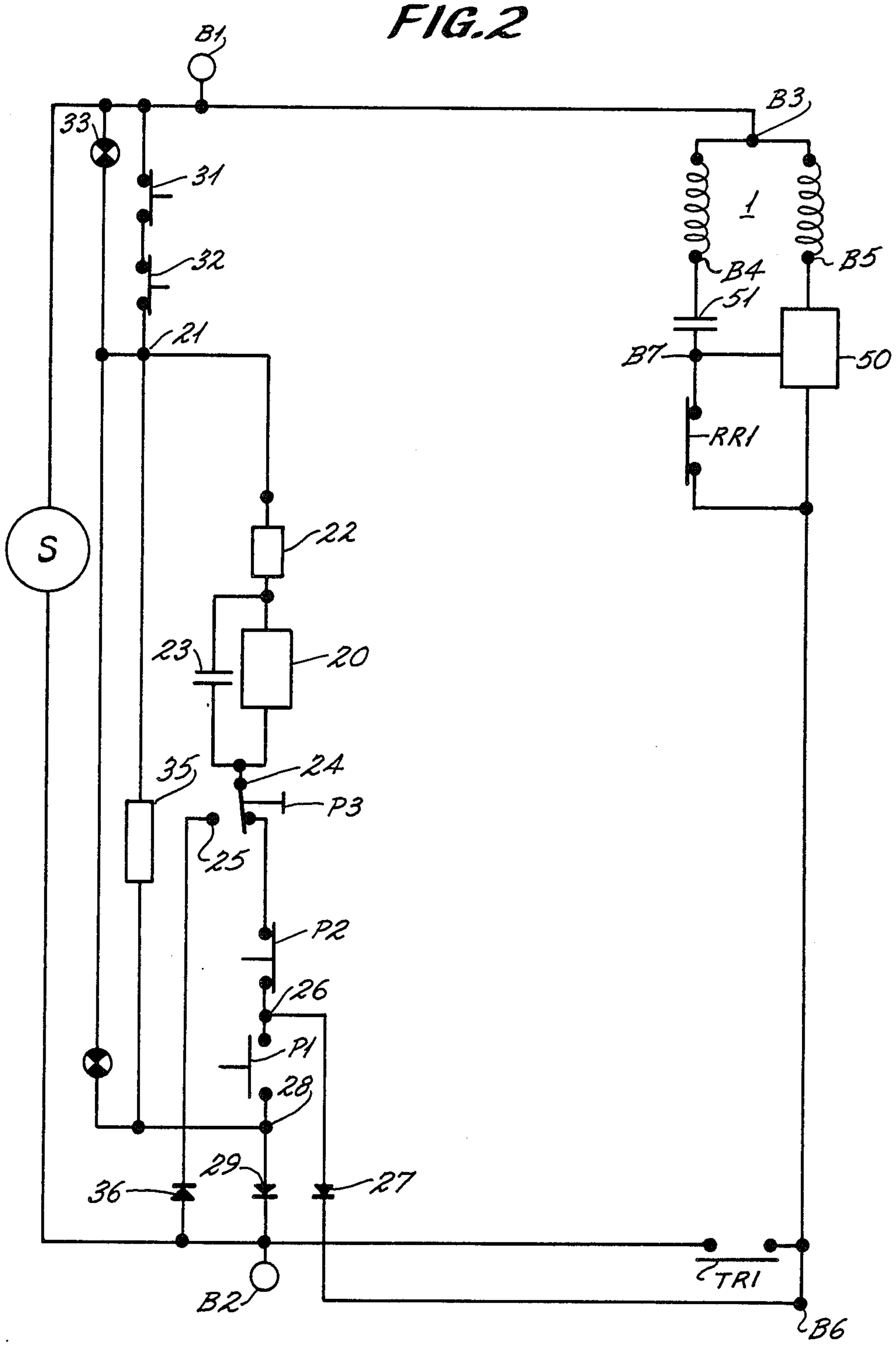
FIG. 2 is a circuit diagram of a second embodiment of the invention wherein the changeover switch incorporates three push button controls disposed between the source of power and the appliance motor.

This operating mishap can be avoided with the set-up represented in FIG. 2 in which the preceding set-up has been completed by a push-button P3 equipped with a make contact and a break contact and a diode 36 rectifying the current in the opposite direction to that of diode 29 or diode 27. The operation for constant power supply and for power cut-off is identical to that of FIG. 1 ; on the contrary, intermittent operation is achieved by actuating a single pushbutton P3 which, when it is actuated, causes current to flow in the opposite direction in relay coil R1. When pushbutton P3 is released, the reversal of the current flow direction through diode 27 allows contact TR1 to open. The changeover switch shown on FIG. 2 conserves the same additional features, that is the safety contacts 31 and 32, the signal lamps 33 and 34, the break contact RR1 used for braking the single phase motor.

The changeover switch for any type of electrical appliance supplied with alternating current that controls constant power supply, intermittent power supply and power cut-off to the said electrical appliance by actuating three pushbuttons, has two terminals 21, B1 and B2 connected to the terminals of the alternating power supply source S, while the said electrical appliance has a terminal B3 connected to terminal B1 and a terminal B6 connected to the third terminal B6 of the said changeover switch. The said changeover switch comprises a resistor 22 connected to terminal 21, B1 and connected in series with relay coil 20, the break contact of pushbutton P3, a normally closed push-button P2, a normally open pushbutton P1 and a diode 29 having its cathode connected to terminal B2. The said changeover switch also comprises a diode 36 with its anode connected to terminal B2 and its cathode connected to the make contact of pushbutton P3. Finally, the said changeover switch comprises a diode 27 with its cathode connected to terminal B6 and its anode connected to the common of the two pushbuttons P1 and P2, while a capacitor 23 is connected in parallel with relay coil R1, make contact TR1 of the said relay being connected between terminals B6 and B2.

Figure 3:
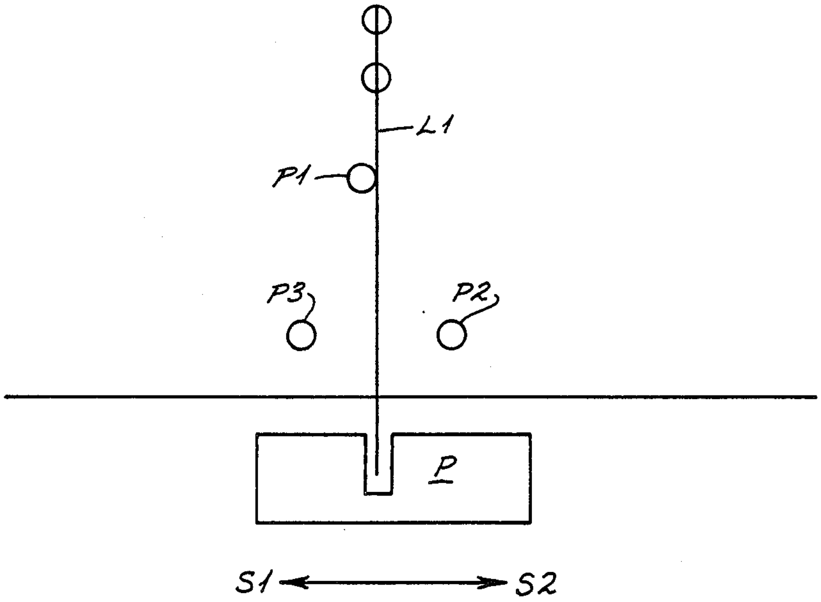
FIG. 3 is a schematic illustration of a first form of sliding push button which may be utilized with the embodiments of the invention shown in FIG. 1 and FIG. 2.
Figure 4:
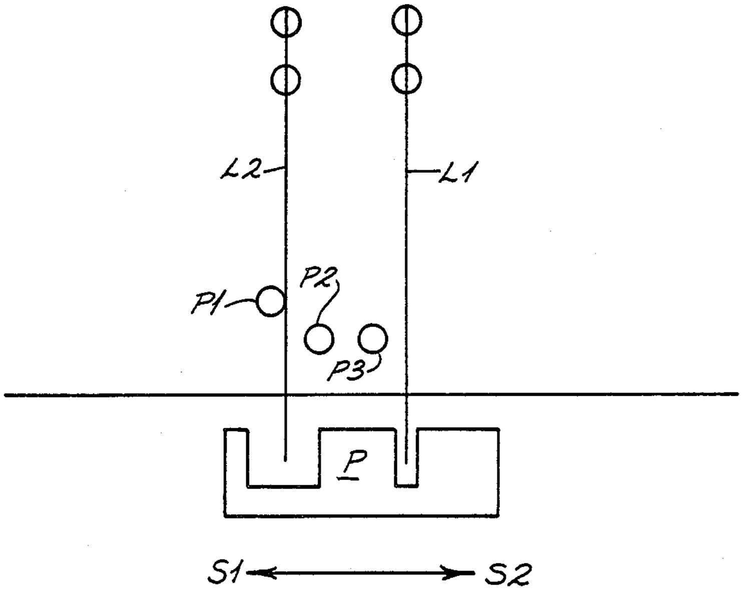
FIG. 4 is a second embodiment of slide switch which may be selectively utilized in the embodiments of the invention disclosed in FIGS. 1 and 2.

Another particular feature of the said changeover switch is that it is possible to fabricate the three pushbuttons P1, P2 and P3 shown in FIG. 2 economically by welding a single assembly onto the printed circuit shown on FIG. 3 and FIG. 4, this assembly bieng composed of one or two flexible conducting reeds L1 and L2 and of three conducting studs P1, P2 and P3. An insulating part P, called lever, controls the three functions. The connection of these assemblies shown on FIG. 3 and FIG. 4 is used instead of the three pushbuttons P1, P2 and P3 shown on FIG. 2, by connecting the reed(s) L1 (and L2) to terminal 24, the stud P1 to terminal 26, stud P2 to terminal 25, stud P3 to terminal 28. By shifting the lever P in the direction S1, constant power supply is obtained ; then, by shifting further intermittent operation is obtained. The flexible reed L1 returns part P to the inoperative position after each action.

Safety components can be added in the changeover switches described above in order to cut out power supply to the appliance, these safety components comprising at least one safety contact 31 and one safety contact 32 connected in series between terminal B1 and terminal 21. The display means to indicate the state of the safety contacts comprise a signal lamp placed between terminal B1 and terminal 21 and/or an other safety lamp 34 placed between terminal 21 and the anode of diode 29, with a resistor 35 connected in parallel with signal lamp 34.

Figure 5:
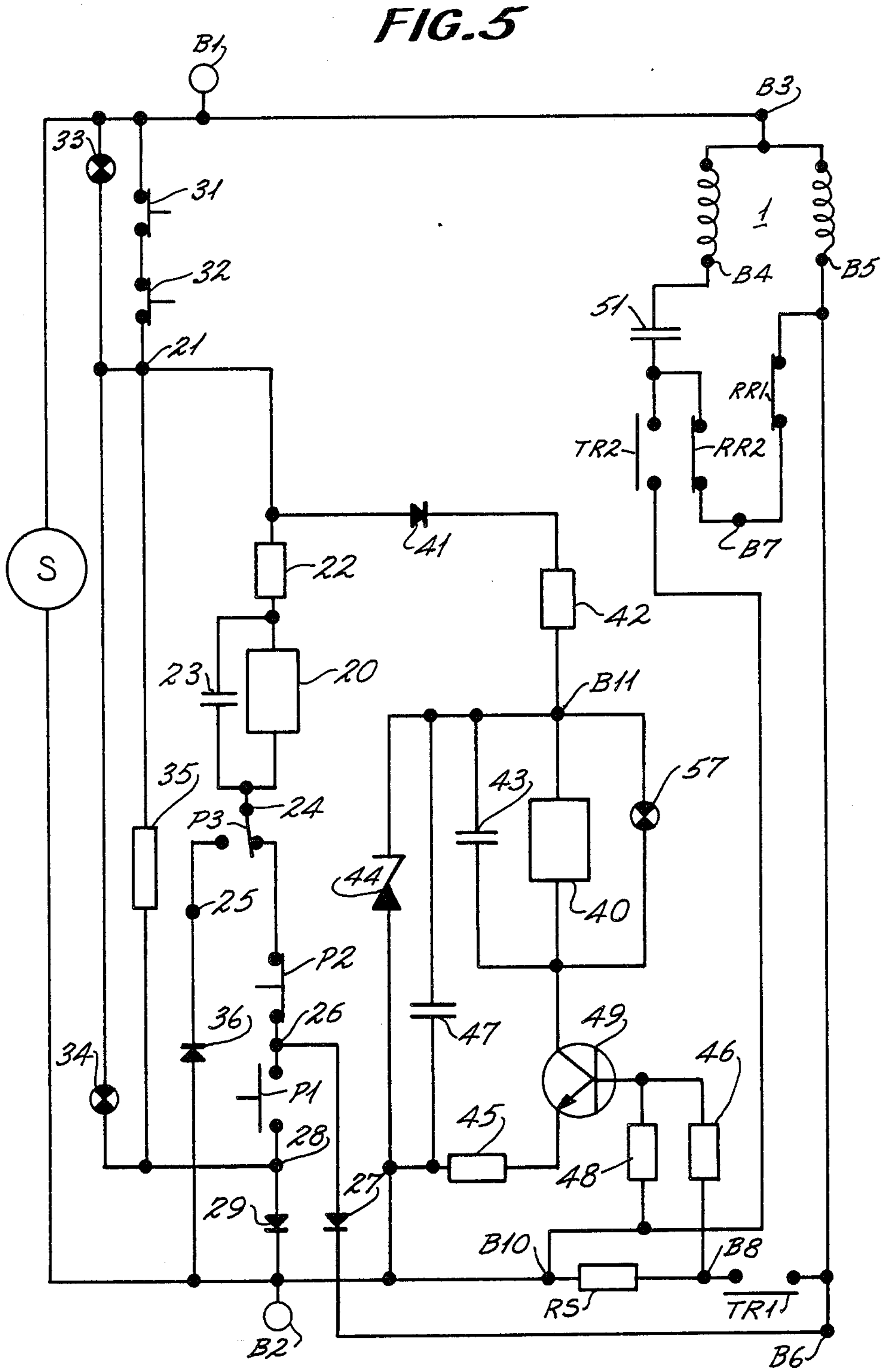
FIG. 5 is another embodiment of the present invention wherein the changeover switch illustrated in FIG. 2 has been further adapted with a detector circuit mounted intermediate the power source and the appliance motor.

The part called current detector, according to the present invention, is illustrated on FIG. 5 along with the device called changeover switch. The load current detector is used on the one hand to switch the starting capacitor 51 of the single phase motor 1, and, on the other hand, to indicate by means of signal lamp 67 the presence of overcurrent in the single phase motor 1.

When power is supplied by means of the device called changeover switch previously described, the value of the current flowing in motor 1 between terminals B3 and B5 is high. This current generates an alternating voltage at terminals B10 and B8 of resistor RS that causes transistor 49 to be conducting on one half cycle, due to the current delivered from terminal B8, flowing through resistor 46, the emitter-base junction of transistor 49, resistor 45 and finally reaching terminal B10. Because transistor 49 is conducting, a current is generated, rectified by diode 41, flows through resistor 42, into relay coil 40, into the emitter-collector junction of transistor 49, and into resistor 45. To limit the transistor emitter-collector voltage, a zener diode is added between terminals B11 and B10. To limit phase shift between the voltage of source S and the current is RS, a capacitor 47 is added between terminals B11 and B10. The current flowing in relay coil 40, stabilized by capacitor 43 connected in parallel with the said coil, causes make contact TR2 of the relay to close, which connects up starting capacitor 51 and the starting coil of motor 1. This connection starts up motor 1.

Once single phase motor 1 has started, and during normal operation of the motor involving no overcurrent, the voltage at the terminals of resistor RS is no longer high enough to render transistor 49 conducting and consequently the make contact TR2 of the relay opens, disconnecting the starting circuit.

In the event of a mechanical overload or a defect in the motor entailing a notable increase in current, transistor 49 becomes conducting and relay coil 40 is energized, relay contact TR2 closes in the same way as for start-up. In order to inform the operator of this overcurrent, a signal lamp 57 is placed in parallel with relay coil 40.

To compensate the effect of temperature on the system, a resistor 48 with negative temperature coefficient of resistance is added between the base of the transistor and terminal B10, B2.

One of the particular features of the changeover switch is that it can be combined with the so-called current detector as shown on FIG. 5 to connect the starting capacitor 61 of the single phase motor. The said current detector comprises a diode 41 having its anode connected to terminal 21 and placed in series with resistor 42, the relay coil 40 of the current detector, the collector-emitter junction of transistor 49, a resistor 45 arriving at terminal B2. A capacitor 43 is placed in parallel with relay coil 40 ; between the common of relay coil 40 and of resistor 42, and terminal B2, a capacitor 47 is connected in parallel along with a zener diode 44 having its anode connected on B2. In addition the said detector comprises a resistor in series RS placed between terminal B2 and make contact TR1 of the changeover switch relay ; a resistor 46 is connected between the base of transistor 49 and the common of resistor RS and of make contact TR1. Finally the said detector comprises make contact TR2 of the relay connected between terminals B6 and B9, starting capacitor 51 connected between terminals B9 and B4, break contact RR2 of the said relay connected in series with break contact RR1, forming the braking circuit and arriving at terminal B5.

Low value resistor RS can be in the form of a resisting wire or a track of a printed circuit.

In a preferred embodiment of the invention, all the components of the so-called changeover switch and of the so-called current detector can be welded on a printed circuit in order to reduce wiring to a minimum and to form thereby a complete and economical control device of a single phase capacitor motor.

I claim:

1. A changeover switch for the motors of electrical appliances and which is electrically connected to regulate the alternating current to the first and second terminals of the appliance motor from the first and second terminals of a power source wherein the first motor terminal is connected with the first terminal of the power source, comprising, first and second switch terminal means for connecting the changeover switch to the first and second terminals of the power source, a third switch terminal means for connecting the changeover switch to the second motor terminal, a first normally open and a second normally closed push button means, a first diode connected betwen said first normally open and said second normally closed push button means and said third switch terminal means, a first resistor, a first relay coil, and a second diode connected in series with said first normally open and said second normally closed push button means and said first and second switch terminal means, a capacitor connected in parallel with said first relay coil and a first circuit make contact for supplying current from the second terminal of the power source to the second terminal of the motor.

2. The changeover switch of claim 1 including a third push button means, said third push button means having circuit make and brake contacts, said third push button means being in series with said first and second push button means through said brake contact thereof, a third diode having its anode connected to said second switch terminal means and its cathode connected to said make contact of said third push button means, said third push button means being movable to connect said make contact and said third diode to said first relay coil to thereby reverse the current flow therethrough so as to provide intermittent power to the motor.

3. The changeover switch of claim 2 in which said first, second and third push button means include first, second and third conductive stud members, respectively, at least one flexible conducting means connected to and extending from said first relay coil and between said first, second and third push button means so as to normally be in engagement with said second stud member and being spaced from said first and third conductive stud members, and insulating means reciprocally movable relative to said at least one flexible conducting means for shifting said flexible conducting means in a first direction to simultaneously connect said second and third conductive stud members in series and in a second direction for disconnecting said second conductive stud member and engaging said first conductive stud member.

4. The changeover switch of any of claims 1–3 including at least one safety switch means connected in series with said first and second switch terminal means, said at least one safety switch means being operable to interrupt power to the appliance motor through the changeover switch.

5. The changeover switch of claim 4 including signal means connected in parallel with said at least one safety switch means for indicating the condition of said at least one safety switch means.

6. The changeover switch of claim 5 including a second signal means, said second signal means connected in series with said first signal means and said second diode, and a second resistor connected parallel to said second signal means.

7. The changeover switch of any of claims 1–3 in which the motor of the electrical appliance is a single phase capacitor motor having a main winding, a starter winding, a starting capacitor in series with said starter winding, a current relay connected between said main winding and said starting capacitor and being in series with the first and second terminals of the appliance motor, and a brake contact controlled by said current relay whereby said single phase motor is braked when power is terminated to the first and second terminals of the motor.

8. The changeover switch of claims 7 including at least one safety switch means connected in series with said first and second switch terminal means, said at least one safety switch means being operable to interrupt power to the appliance motor through the changeover switch.

9. The changeover switch of any of claims 1–3 in which the electrical appliance motor is a single phase capacitor motor having a main winding and a starter winding, a starting capacitor in series with said starter winding, a current detector for switching said starter capacitor, said current detector including a current relay having a brake contact for braking said motor when power is terminated to the first and second terminals of the appliance motor and a make contact for activating said starting capacitor and said starter winding, said current detector being connected between the first and second terminals of the power source and being activated by a high current surge to close said make contact to activate said motor.

10. The changeover switch of claim 9 in which said current detector includes a series resistor connected to the second terminal of the power source, a transistor connected to said series resistor having a base terminal, emitter terminal and an emitter-collector junction, a secondary resistor connected to the base terminal and a third resistor connected to the emitter terminal, the current to the emitter-collector junction of the transistor being supplied through a detector diode, detector resistor and a detector relay coil which are connected in series to the first terminal of the power source, a capacitor in parallel with said detector relay, and the current from said transistor being regulated by a zenor diode and an additional capacitor which are connected in parallel with said detector relay coil.

11. The changeover switch of claim 10 including a detector signal means connected in parallel to said detector relay coil to thereby reflect overcurrent in said motor.

12. The changeover switch of claim 10 including a supplemental resistor having a negative temperature coefficient of resistance mounted between the second terminal of the power source and the base terminal of said transistor.

* * * * *